(12) United States Patent
Hinrichs

(10) Patent No.: US 11,279,424 B1
(45) Date of Patent: Mar. 22, 2022

(54) METHOD OF INSTALLING A SUNROOF INSERT INTO A REMOVABLE ROOF PANEL OF A VEHICLE

(71) Applicant: Christopher W. Hinrichs, Delafield, WI (US)

(72) Inventor: Christopher W. Hinrichs, Delafield, WI (US)

( * ) Notice: Subject to any disclaimer, the term of this patent is extended or adjusted under 35 U.S.C. 154(b) by 0 days.

(21) Appl. No.: 17/079,571

(22) Filed: Oct. 26, 2020

(51) Int. Cl.
*B62D 65/06* (2006.01)
*B60J 10/70* (2016.01)
*B60J 7/08* (2006.01)

(52) U.S. Cl.
CPC .............. *B62D 65/06* (2013.01); *B60J 10/70* (2016.02); *B60J 7/08* (2013.01)

(58) Field of Classification Search
CPC .............. B60J 10/70; B60J 7/08; B62D 65/06
See application file for complete search history.

(56) References Cited

U.S. PATENT DOCUMENTS

| | | | | |
|---|---|---|---|---|
| 4,154,474 A | * | 5/1979 | Hough | B60J 7/1642 296/218 |
| 4,216,983 A | * | 8/1980 | Hough | B60J 7/1642 292/263 |
| 4,356,717 A | * | 11/1982 | Okunishi | C21D 1/673 72/334 |
| 5,211,047 A | * | 5/1993 | Kaneyuki | B21D 53/88 72/347 |
| 6,244,653 B1 | * | 6/2001 | Nishio | B29C 45/1675 296/216.01 |
| 6,408,516 B1 | * | 6/2002 | Taylor | B21D 39/021 29/430 |

\* cited by examiner

*Primary Examiner* — Bayan Salone
(74) *Attorney, Agent, or Firm* — Donald J. Ersler

(57) ABSTRACT

A method of installing a sunroof insert into a removable roof panel of a vehicle preferably includes a reinforced plexiglass sunroof insert. The sunroof insert preferably includes a top surface, a peripheral sidewall and a peripheral flange. The removable roof panel includes a top skin and a bottom skin. A top insert opening is formed in the top skin. A bottom insert opening is formed in the bottom skin. A bottom adhesive is applied to a bottom surface of the bottom skin, around a perimeter of the bottom insert opening. The sunroof insert is inserted into the bottom insert opening and then the top insert opening. The bottom adhesive will create a bond between the bottom skin and the peripheral flange. A top adhesive is used to fill a top peripheral gap between the sunroof insert and the peripheral strip of tape.

14 Claims, 13 Drawing Sheets

METHOD OF INSTALLING A SUNROOF INSERT INTO A REMOVABLE ROOF PANEL OF A VEHICLE

BACKGROUND OF THE INVENTION

1. Field of the Invention

The present invention relates generally to wheeled vehicles and more specifically to a method of installing a sunroof insert into a removable roof panel of a vehicle, which is not available as original equipment from the manufacturer.

2. Discussion of the Prior Art

Manufacturers of vehicles with removable roof panels do not offer the option of a removable roof panel with a sunroof. Consequently, a sunroof insert must be installed by a third party with sunroof installation expertise.

Accordingly, there is a clearly felt need in the art for a method of installing a sunroof insert into a removable roof panel of a vehicle, which is not available as original equipment from the manufacturer.

SUMMARY OF THE INVENTION

The present invention provides a method of installing a sunroof insert into a removable roof panel of a vehicle, which is not available as original equipment from the manufacturer. The method of installing a sunroof insert into a removable roof panel of a vehicle (method of sunroof installation) preferably includes obtaining a reinforced plexiglass sunroof insert. The sunroof insert preferably includes a top surface, a peripheral sidewall and a peripheral flange. The peripheral sidewall preferably includes a notched area. The peripheral sidewall extends downward from an outer perimeter of the top surface. The peripheral flange extends outward from a bottom of the peripheral sidewall.

The removable roof panel includes a top skin and a bottom skin. A top insert opening is cut in the top skin using any suitable method, such as a top template and a hand router tool. A bottom insert opening is cut in the bottom skin using any suitable method, such as a bottom template and the hand router tool. However, an automated router could also be used for the top and bottom insert openings. A peripheral strip of tape is applied to a bottom surface of the top skin, adjacent a perimeter of the top insert opening. The peripheral strip of tape extends into top insert opening and will contact the peripheral sidewall of the sunroof insert when pushed through the top insert opening. A second peripheral strip of tape is applied to a bottom surface of the bottom skin, adjacent a perimeter of the bottom insert opening. The second peripheral strip of tape is spaced away from the bottom insert opening to provide protection to the bottom surface of the bottom skin from application of a bottom adhesive. It is preferable to apply a protective film to a top surface of the sunroof insert to prevent scratches and protect against contact with adhesive.

A bottom adhesive is applied to a bottom surface of the bottom skin, around a perimeter of the bottom insert opening. The sunroof insert is inserted into the bottom insert opening and then the top insert opening. The peripheral strip of tape is pushed upward by the insertion of the sunroof insert. The bottom adhesive will create a bond between the bottom skin and the peripheral flange. It is preferable to place spacer tools in perimeter gap between the top insert opening and the peripheral sidewall of the sunroof insert to provide a consistent gap therebetween. After the bottom adhesive cures, the peripheral strip of tape is pushed back into the top insert opening. A top adhesive is used to fill a top peripheral gap between the sunroof insert and the peripheral strip of tape. The top peripheral gap is filled with the top adhesive, below the top skin. A top gasket molding is pushed into the top peripheral gap. After the top adhesive curves, a knife or the like is used to cut around a perimeter of the peripheral flange. The excess second peripheral strip of tape is removed.

Accordingly, it is an object of the present invention to provide a method of sunroof installation, which is not available as original equipment from the manufacturer.

These and additional objects, advantages, features and benefits of the present invention will become apparent from the following specification.

DETAILED DESCRIPTION OF THE PREFERRED EMBODIMENTS

Figure 1:
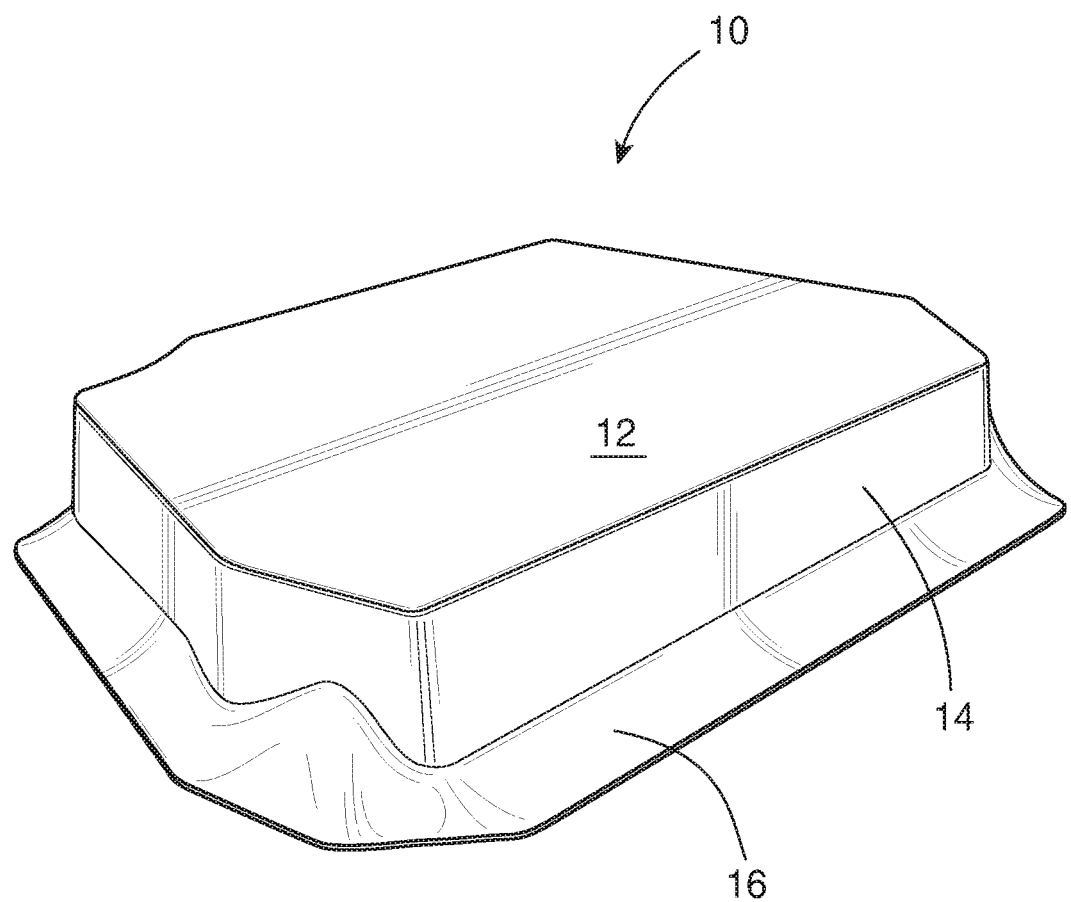
FIG. 1 is a perspective view of a sunroof insert of a method of sunroof installation in accordance with the present invention.
Figure 2:
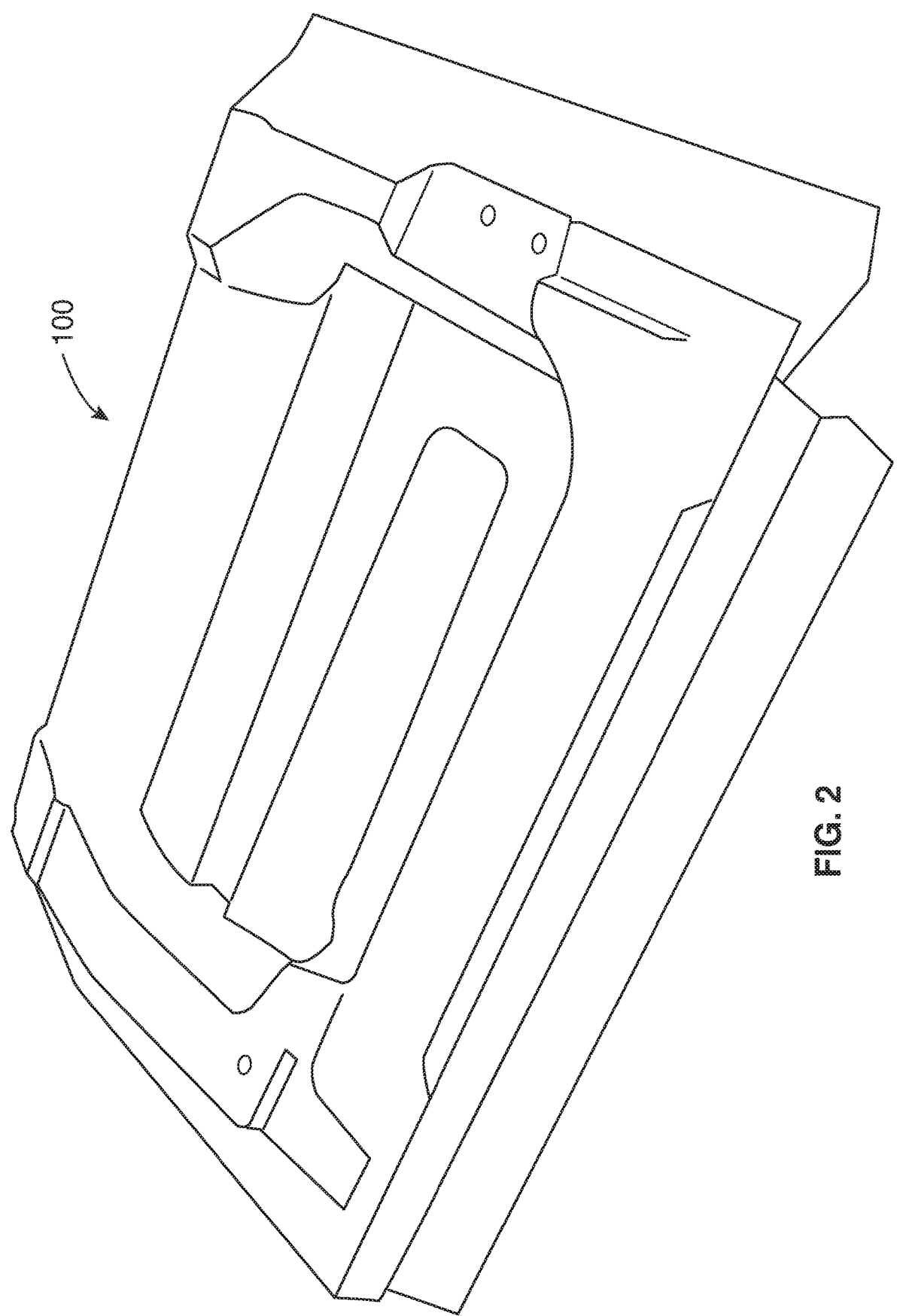
FIG. 2 is a bottom perspective view of a removable roof panel of a method of sunroof installation in accordance with the present invention.
Figure 3:
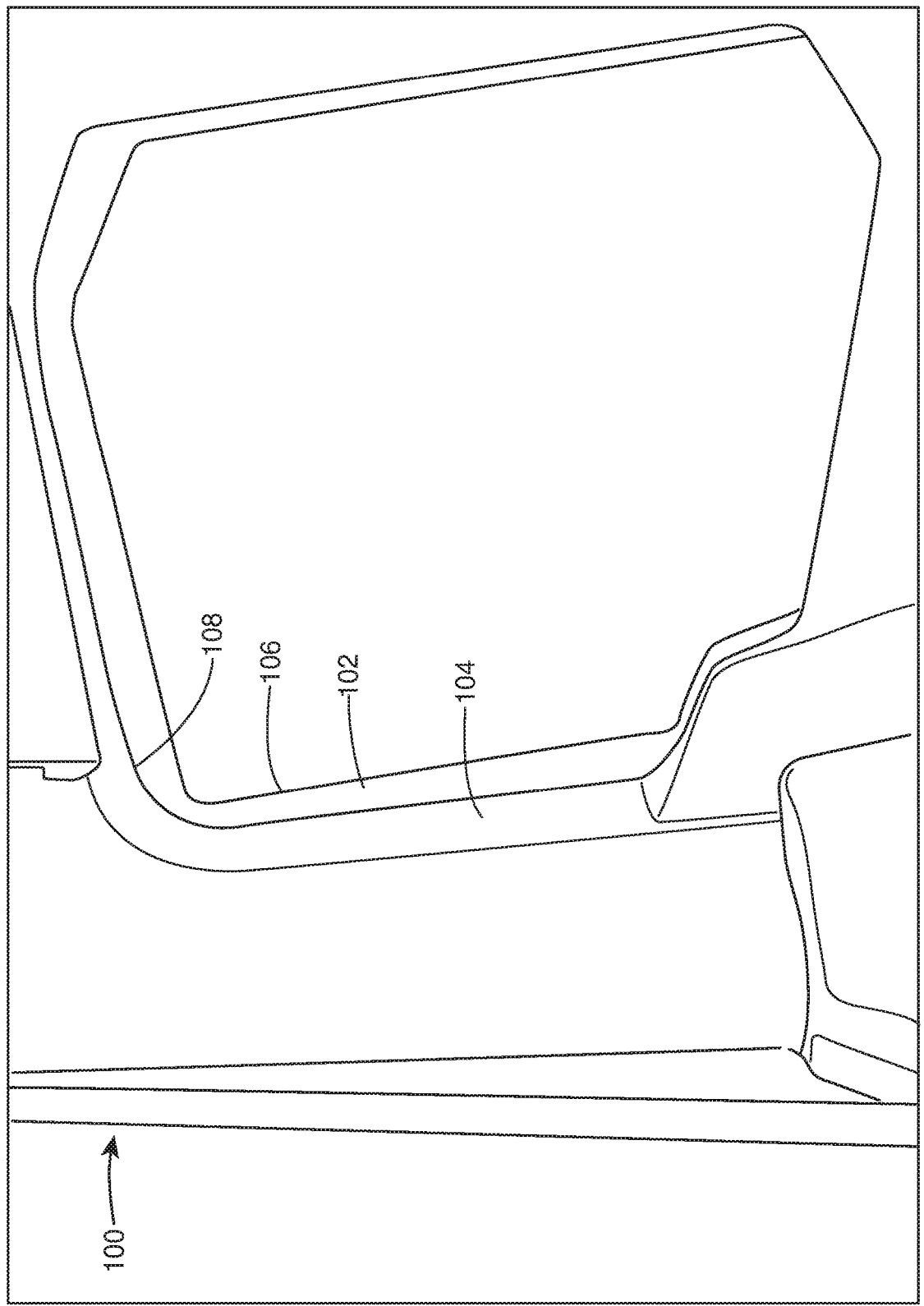
FIG. 3 is a bottom perspective view of a removable roof panel with a bottom insert opening and a top insert opening formed therein of a method of sunroof installation in accordance with the present invention.

With reference now to the drawings, and particularly to FIG. 1, there is shown a perspective view of a sunroof insert 10. The sunroof insert 10 preferably includes a top surface 12, a peripheral sidewall 14 and a peripheral flange 16. The peripheral sidewall 14 extends downward from an outer perimeter of the top surface 12. The peripheral flange 16 extends outward from a bottom of the peripheral sidewall 14. With reference to FIG. 2, a bottom perspective view of a removable roof panel 100 of a vehicle is shown. With reference to FIG. 3, the removable roof panel 100 includes a top skin 102 and a bottom skin 104. A top insert opening 106 may be cut into the top skin 102 using any suitable method, such as a top template and a hand router tool, or any other suitable method. A bottom insert opening 108 is cut in the bottom skin 104 using any suitable method, such as a bottom template and the hand router tool. An automated router could also be used.

Figure 4:
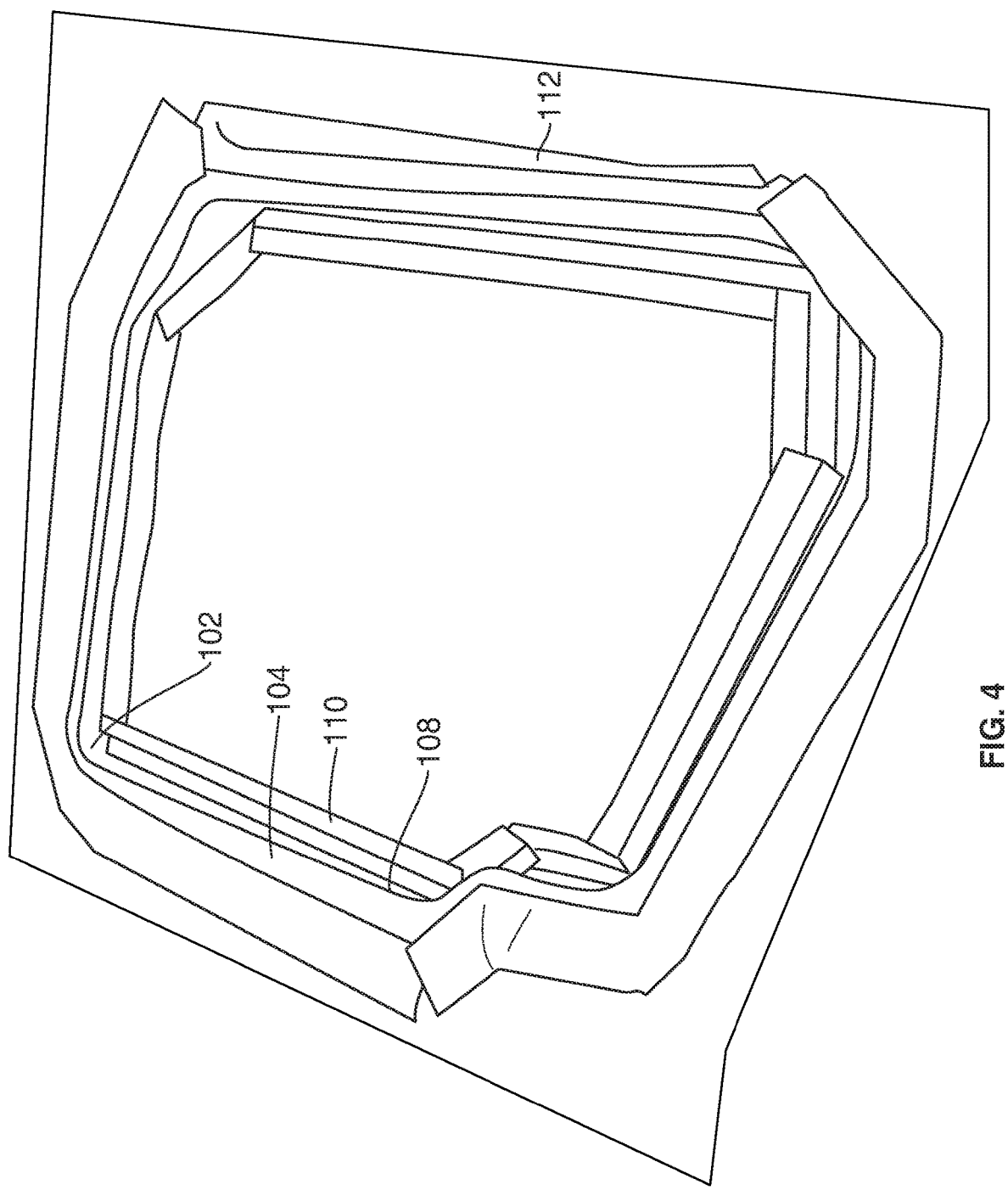
FIG. 4 is a bottom perspective view of a removable roof panel with a peripheral strip of tape applied to a bottom surface of a top skin of the removable roof panel, around a top insert opening, and a second peripheral strip of tape applied to a bottom surface of a bottom skin of the removable roof panel, adjacent a bottom insert opening of a method of sunroof installation in accordance with the present invention.
Figure 5:
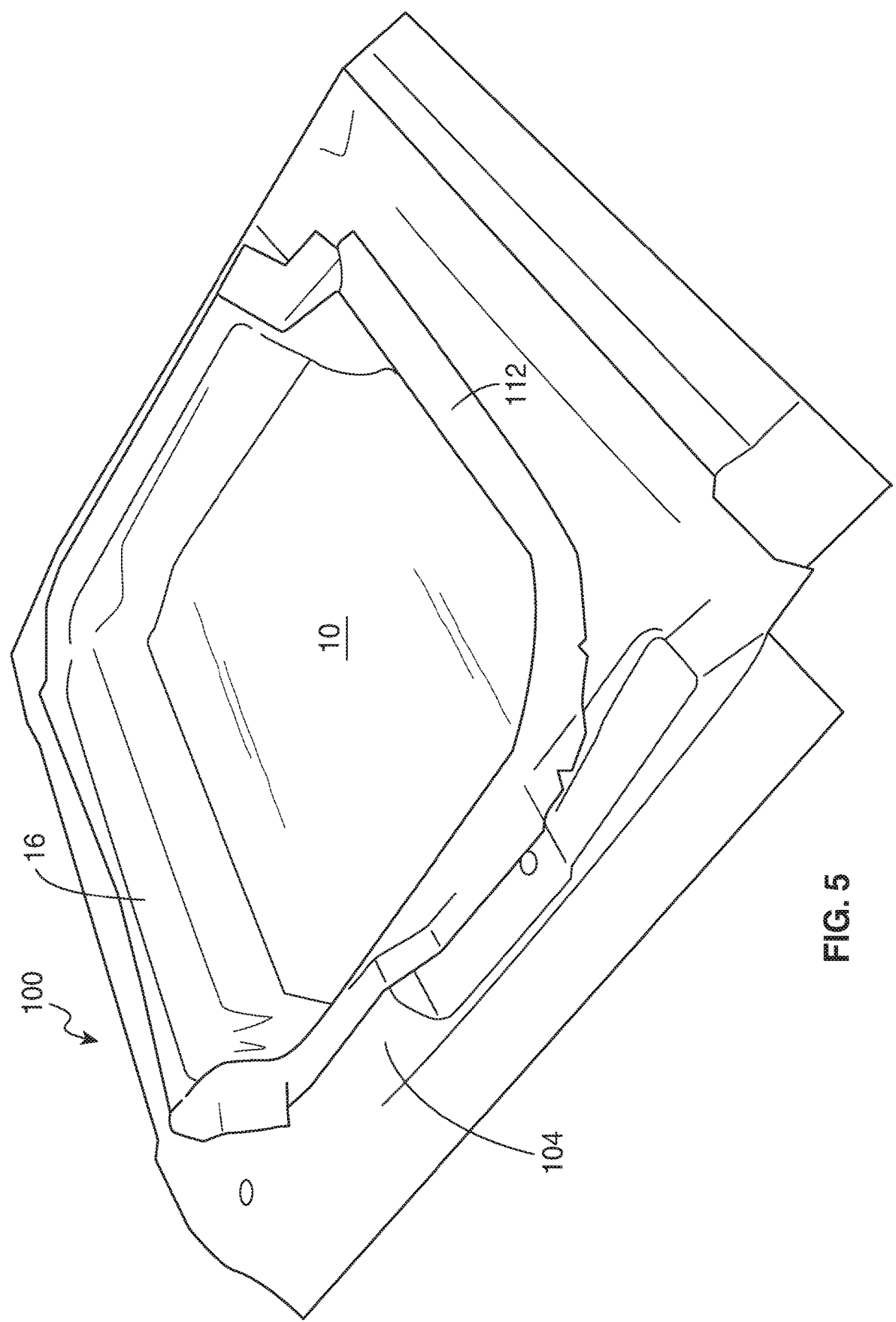
FIG. 5 is a bottom perspective view of a sunroof insert inserted into bottom and top insert openings of a method of sunroof installation in accordance with the present invention.
Figure 11:
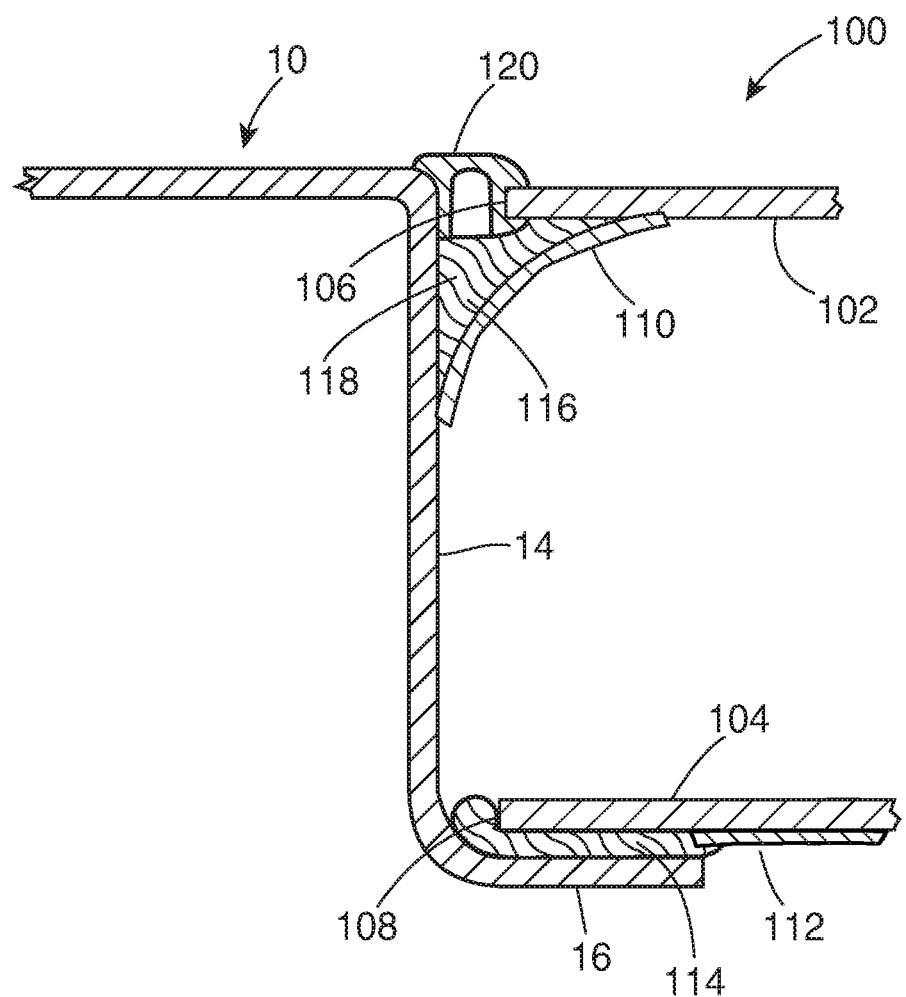
FIG. 11 is a cross sectional view of a portion of a sunroof insert installed in a removable roof panel of a method of sunroof installation in accordance with the present invention.

With reference to FIGS. 4 and 11, a peripheral strip of tape 110 is applied to a bottom surface of the top skin 102, around a perimeter of the top insert opening 106. The peripheral strip of tape 110 extends into top insert opening and will contact the peripheral sidewall 14 of the sunroof insert 10, when inserted therethrough. A second peripheral strip of tape 112 is applied to a bottom surface of the bottom skin 104, adjacent a perimeter of the bottom insert opening 108. The second strip of tape 112 is spaced away from the bottom insert opening 108 to provide protection to the bottom surface of the bottom skin 104 from application of a bottom adhesive 114. It is preferable to apply a protective film to a top surface 12 of the sunroof insert 10 to prevent scratches and protect from contact with adhesive.

Figure 6:
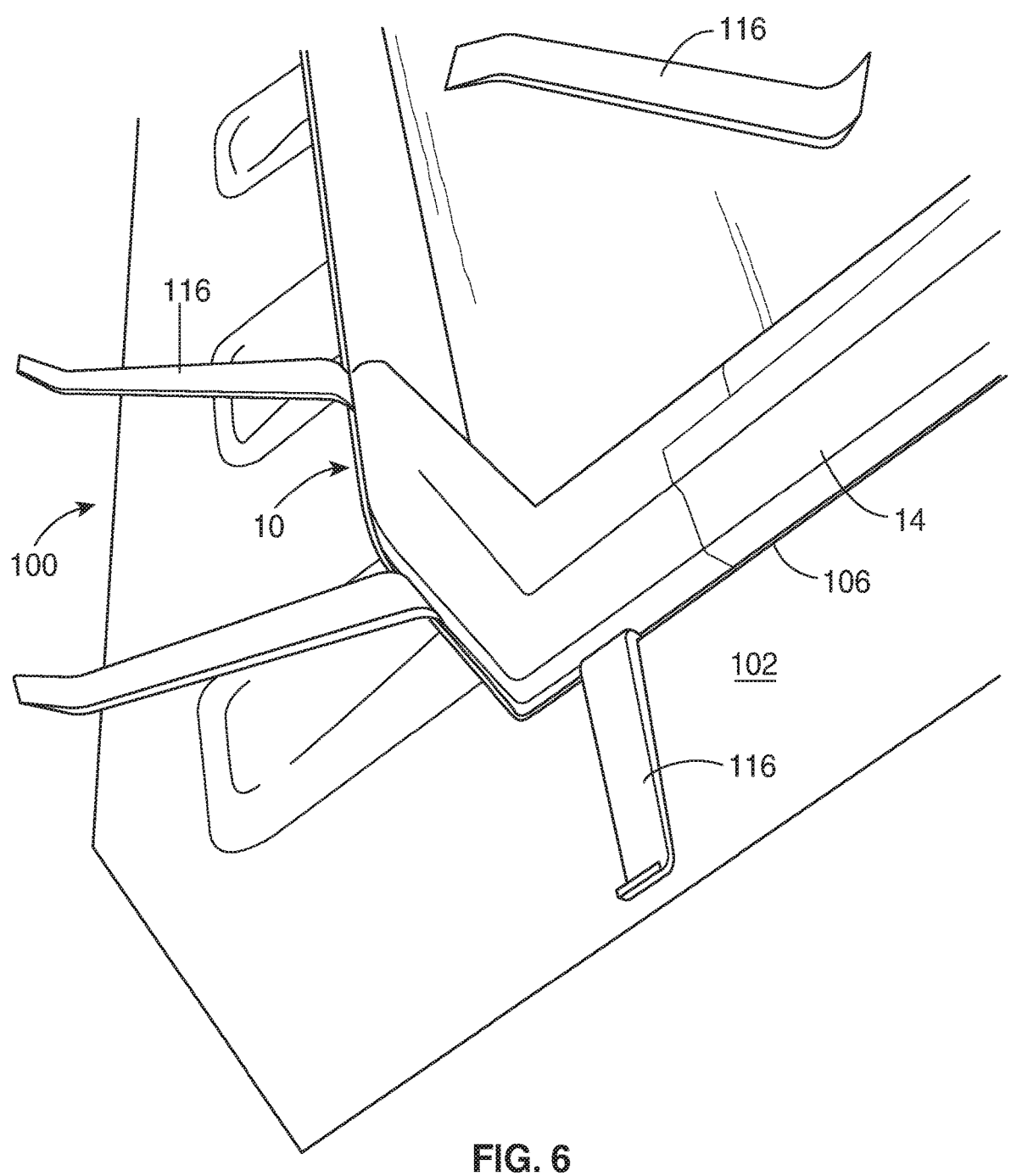
FIG. 6 is a top perspective view of a sunroof insert being aligned in a top insert opening with a plurality of spacer tools of a method of sunroof installation in accordance with the present invention.

With reference to FIG. 11, a bottom adhesive 114 is applied to a bottom surface of the bottom skin 104, around a perimeter of the bottom insert opening 108. The sunroof insert 10 is inserted through the bottom insert opening 108 and then into the top insert opening 106. The peripheral strip of tape 110 is pushed upward by the insertion of the sunroof insert 10. The bottom adhesive 114 will create a bond between the bottom skin 104 and the peripheral flange 16. With reference to FIG. 6, it is preferable to place spacer tools 116 in a perimeter gap between the top insert opening 106 and the peripheral sidewall 14 of the sunroof insert 10 to provide a consistent gap there between.

Figure 7:
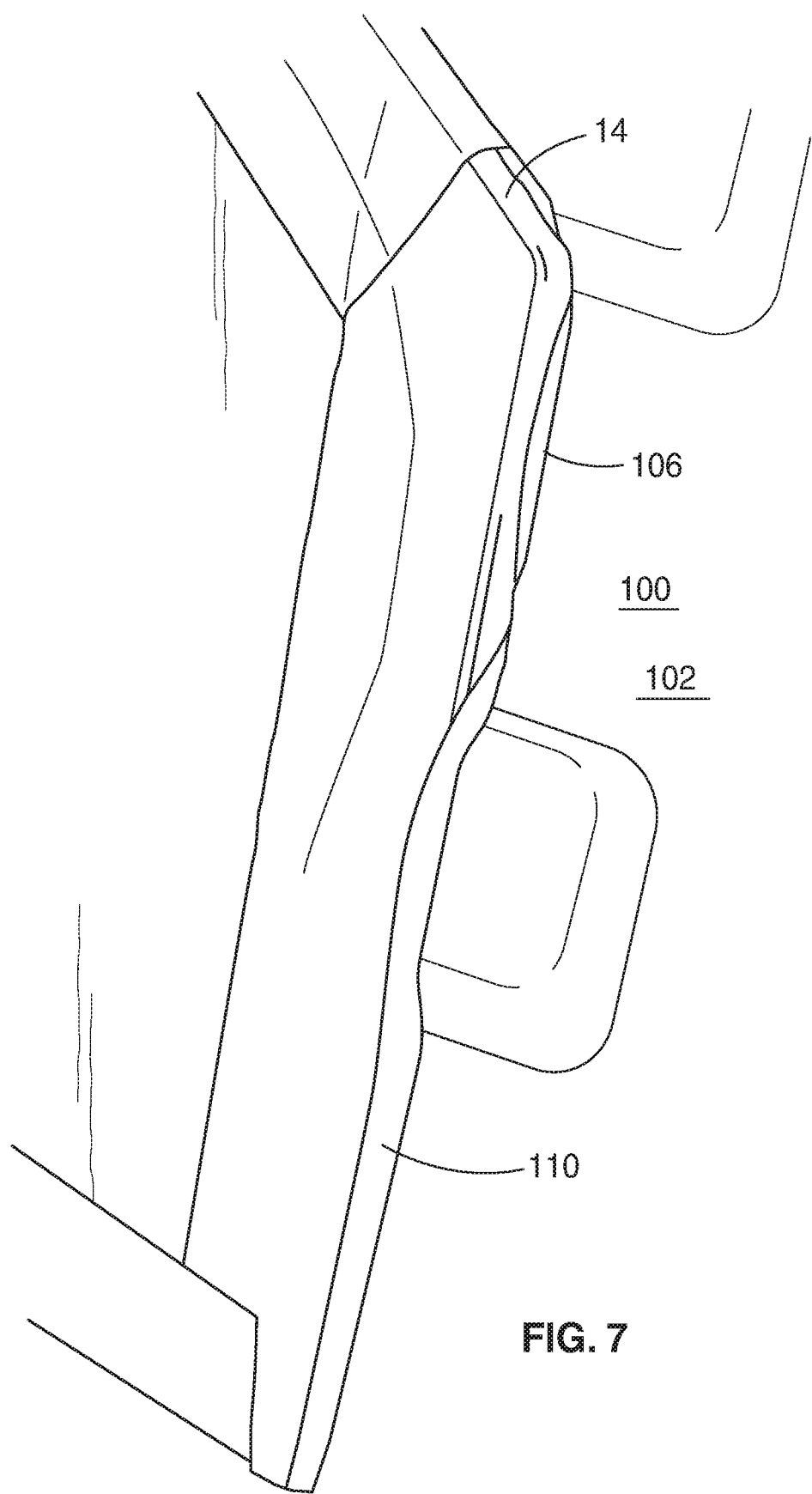
FIG. 7 is a top perspective view of a portion of a second peripheral strip of tape extending out of a top insert opening and a portion of the second peripheral strip of tape pushed back into the top insert opening of a method of sunroof installation in accordance with the present invention.
Figure 8:
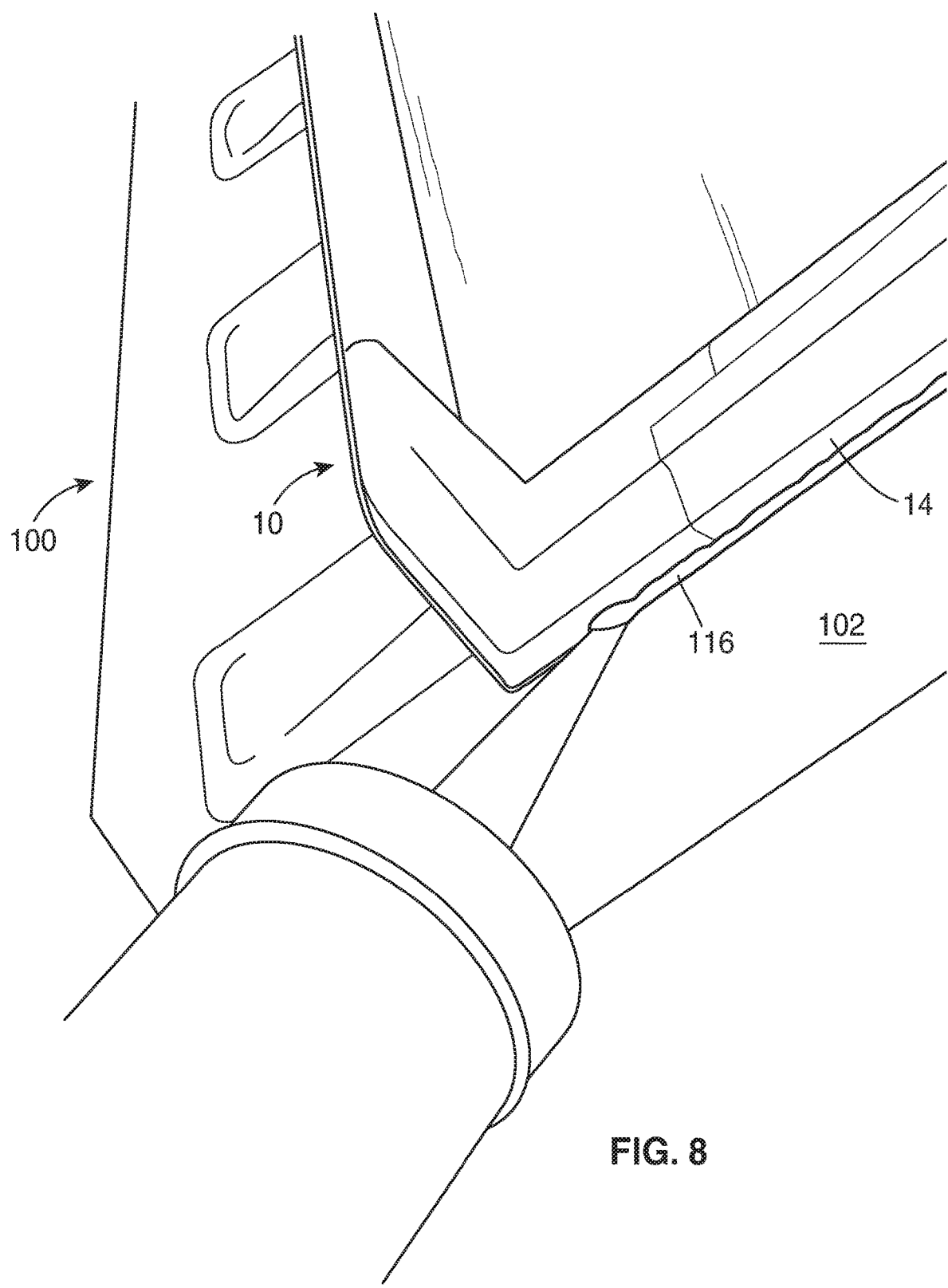
FIG. 8 is a top perspective view of an application of top adhesive filling a top perimeter gap between a peripheral sidewall and a peripheral strip of tape through a top insert opening of a method of sunroof installation in accordance with the present invention.
Figure 9:
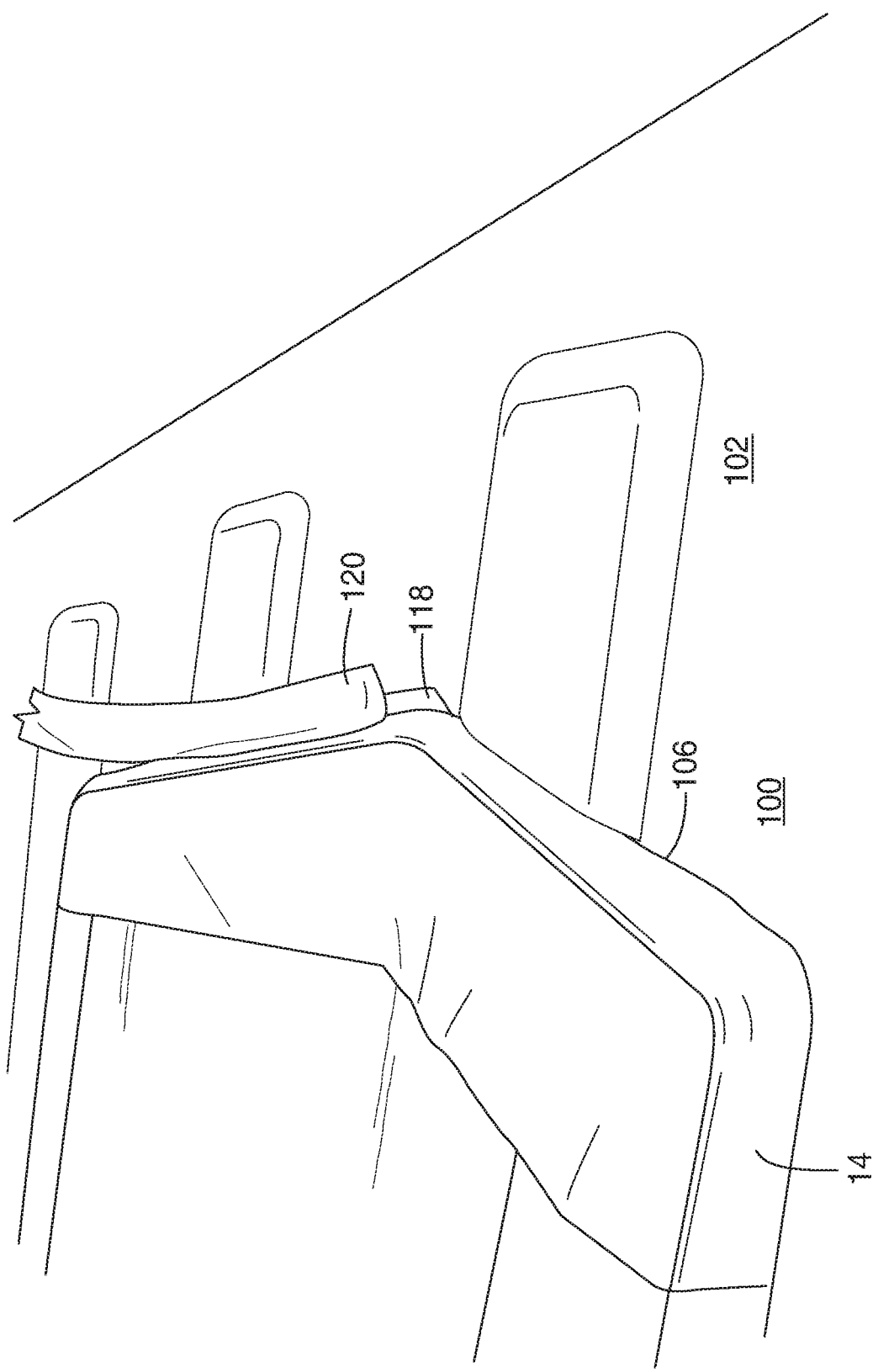
FIG. 9 is a top perspective view of a top gasket molding being pushed into a top peripheral gap between a top insert opening and a peripheral sidewall of a sunroof insert of a method of sunroof installation in accordance with the present invention.
Figure 10:
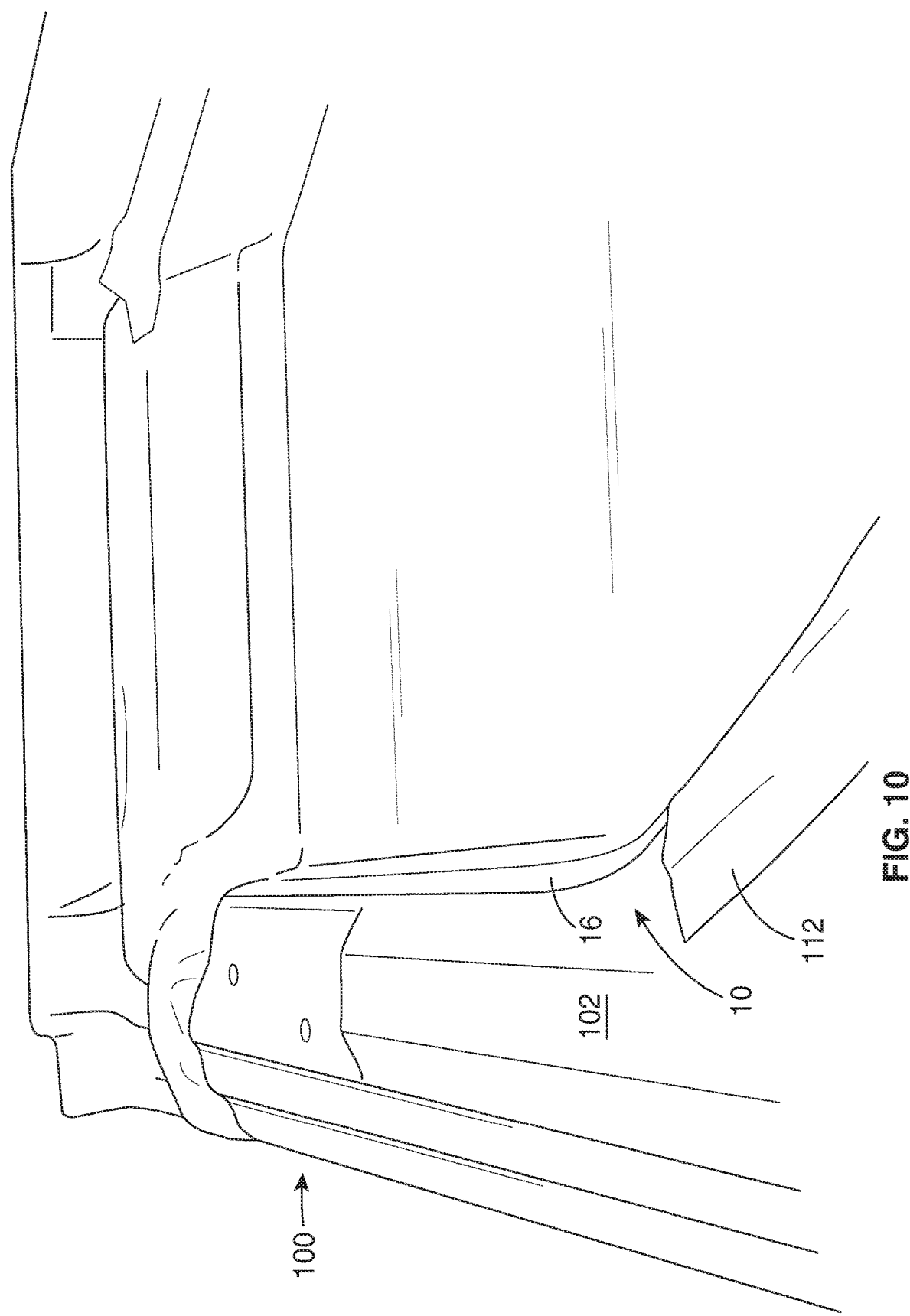
FIG. 10 is a bottom perspective view of a removeable roof panel, which illustrates the removal of excess adhesive and tape around a peripheral flange of a sunroof insert of a method of sunroof installation in accordance with the present invention.
Figure 12:
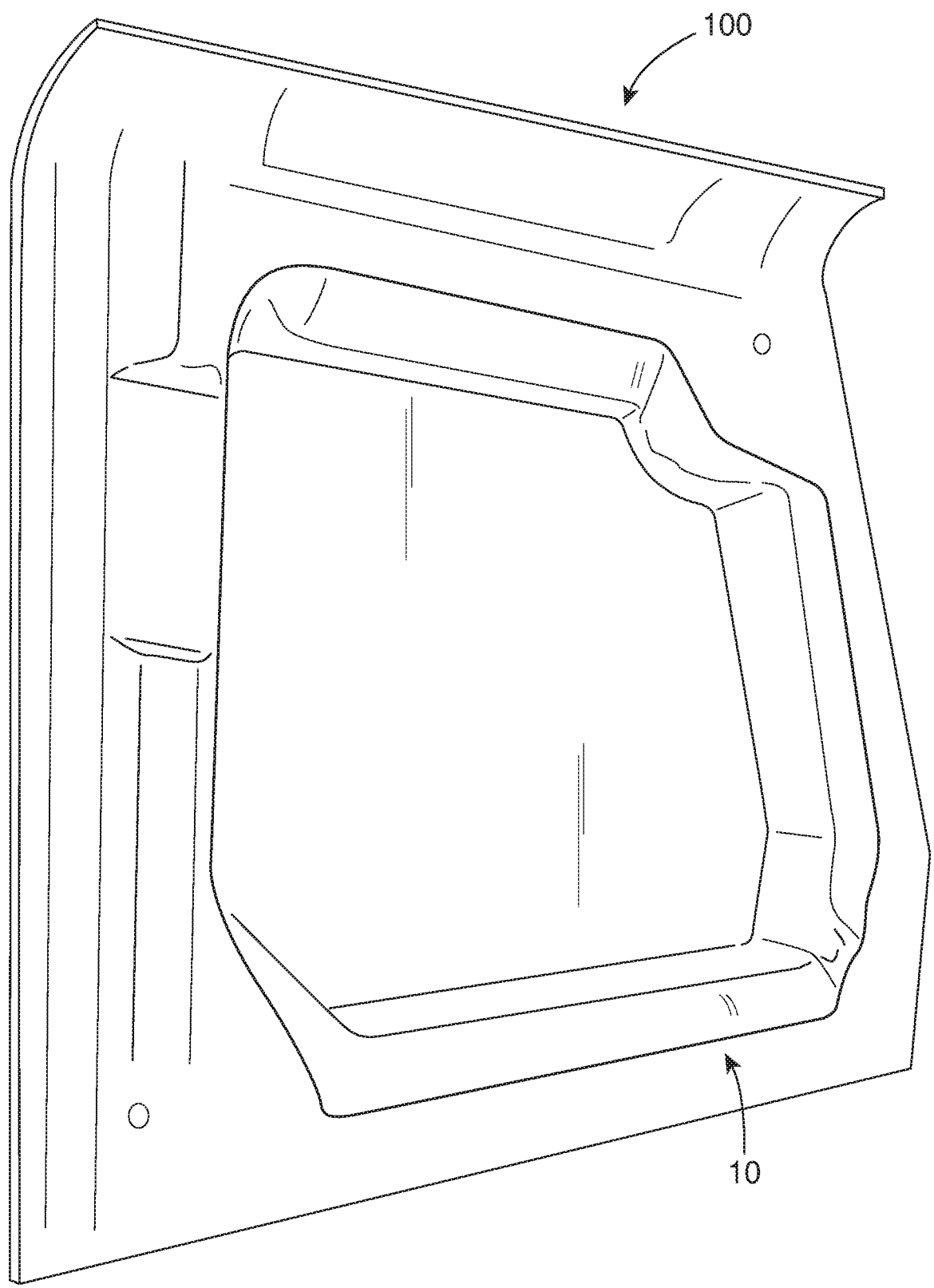
FIG. 12 is a bottom perspective view of a sunroof insert installed in a removable roof panel of a method of sunroof installation in accordance with the present invention.
Figure 13:
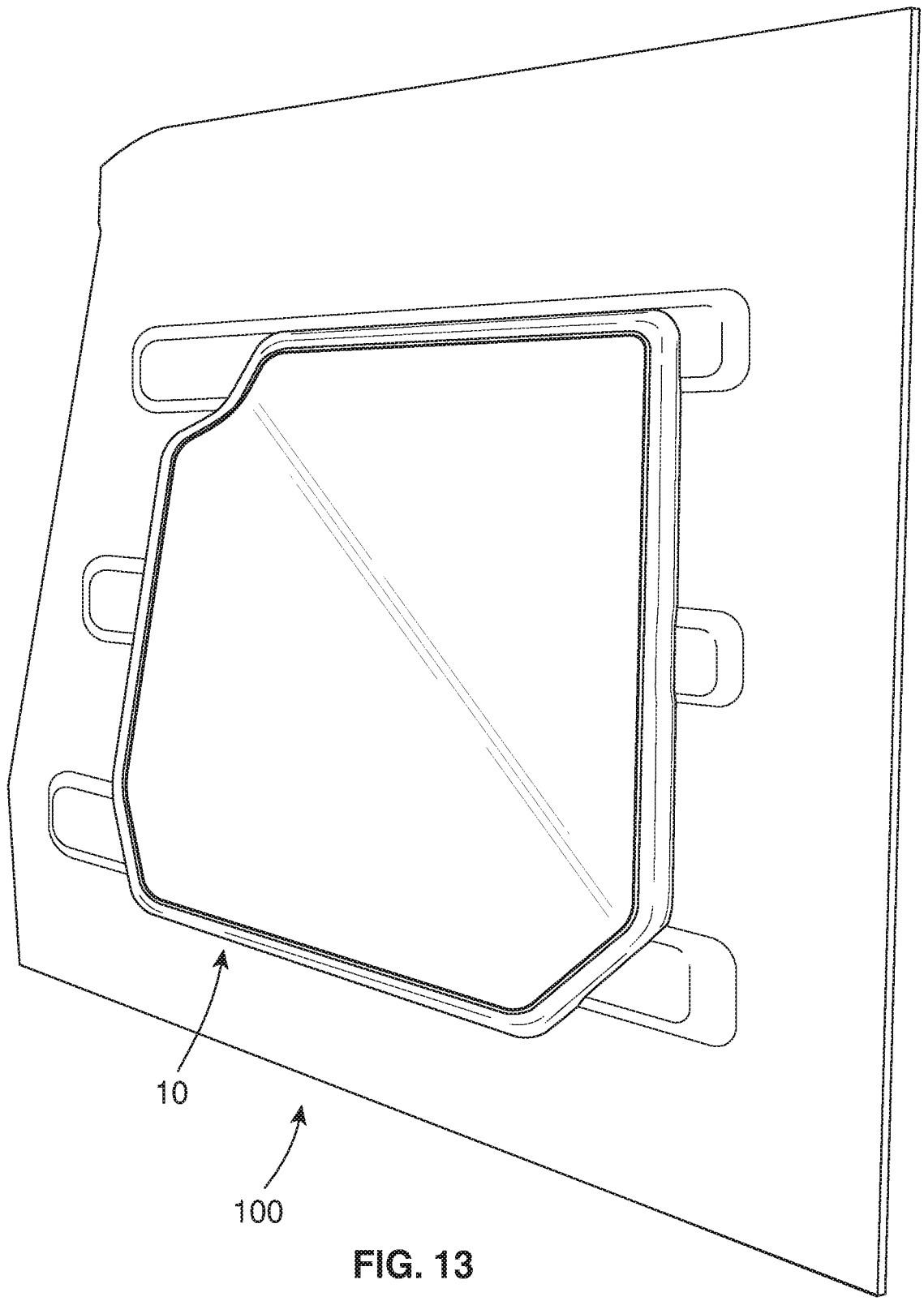
FIG. 13 is a top perspective view of a sunroof insert installed in a removable roof panel of a method of sunroof installation in accordance with the present invention.

With reference to FIGS. 7 and 11, after the bottom adhesive 114 cures, the peripheral strip of tape 110 is pushed back into the top insert opening 106, below the top skin 102. With reference to FIG. 8, a top adhesive 116 is used to fill a top peripheral gap 118 between the peripheral sidewall 14 of the sunroof insert 10 and the peripheral strip of tape 110. A bottom of the peripheral strip of tape 110 contacts the peripheral wall 14 to create a bottom of the top peripheral gap 118. The top peripheral gap 118 is filled with the top adhesive 116, below the top skin 102. With reference to FIG. 9, a top gasket molding 120 is pushed into the top peripheral gap 118. With reference to FIG. 10, after the top and bottom adhesives 114,116 cure, a knife or the like is used to cut the excess second peripheral strip of tape 112 from around a perimeter of the peripheral flange 16 of the sunroof panel 10. The excess second peripheral strip of tape 112 is removed and discarded. It is preferable to use structural bomb grade silicon adhesive for the top and bottom adhesive 114, 116. FIG. 12 discloses a bottom view of a finished roof panel 100 with the sunroof insert 10 installed. FIG. 13 discloses a bottom view of a finished roof panel 100 with the sunroof insert 10 installed. The driver's side removable roof panel 100 is shown. However, a passenger's side removable roof panel is a mirror image of the driver's side removable roof panel 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of installing a sunroof insert into a removable roof panel of a vehicle, comprising the steps of:
    providing said sunroof insert with a top surface and a peripheral sidewall, said peripheral sidewall extends downward from said top surface;
    providing a removable roof panel having a top skin and a bottom skin;
    forming a top insert opening through said top skin;
    forming a bottom insert opening through said bottom skin;
    inserting said sunroof panel through said bottom insert opening and said top insert opening; and
    applying a top adhesive into a top peripheral gap between said peripheral sidewall and said top insert opening.

2. The method of installing a sunroof insert into a removable roof panel of a vehicle of claim 1, further comprising the steps of:
    applying a peripheral strip of tape to a bottom surface of said top skin around a perimeter of said top insert opening, said peripheral strip of tape extending into said top insert opening.

3. The method of installing a sunroof insert into a removable roof panel of a vehicle of claim 1, further comprising the steps of:
    inserting a top gasket molding into said top peripheral gap.

4. A method of installing a sunroof insert into a removable roof panel of a vehicle, comprising the steps of:
    providing said sunroof panel with a top surface, a peripheral sidewall and a peripheral flange, said peripheral sidewall extends downward from said top surface, said peripheral flange extends outward from a bottom of said peripheral sidewall;
    providing a removable roof panel having a top skin and a bottom skin;
    forming a top insert opening through said top skin;
    forming a bottom insert opening through said bottom skin;
    applying a bottom adhesive to a bottom surface of said bottom skin, around a perimeter of said bottom insert opening; and
    inserting said sunroof panel through said bottom insert opening and said top insert opening.

5. The method of installing a sunroof insert into a removable roof panel of a vehicle of claim 4, further comprising the steps of:
applying a peripheral strip of tape to a bottom surface of said bottom skin adjacent a perimeter of said bottom insert opening.

6. The method of installing a sunroof insert into a removable roof panel of a vehicle of claim 4, further comprising the steps of:
inserting a plurality of spacer tools between said upper insert opening and said peripheral sidewall, while said bottom adhesive is curing.

7. The method of installing a sunroof insert into a removable roof panel of a vehicle of claim 4, further comprising the steps of:
inserting a top gasket molding into said top peripheral gap.

8. The method of installing a sunroof insert into a removable roof panel of a vehicle of claim 5, further comprising the steps of:
trimming an excess of said second peripheral strip of tape from an outer perimeter of said peripheral flange.

9. A method of installing a sunroof insert into a removable roof panel of a vehicle, comprising the steps of:
providing said sunroof panel with a top surface, a peripheral sidewall and a peripheral flange, said peripheral sidewall extends downward from said top surface, said peripheral flange extends outward from a bottom of said peripheral sidewall;
providing a removable roof panel having a top skin and a bottom skin;
forming a top insert opening through said top skin;
forming a bottom insert opening through said bottom skin;
applying a bottom adhesive to a bottom surface of said bottom skin, around a perimeter of said bottom insert opening;
inserting said sunroof panel through said bottom insert opening and said top insert opening; and
applying a top adhesive into a top peripheral gap between said peripheral sidewall and said top insert opening.

10. The method of installing a sunroof insert into a removable roof panel of a vehicle of claim 9, further comprising the steps of:
applying a peripheral strip of tape to a bottom surface of said top skin around a perimeter of said top insert opening, said peripheral strip of tape extending into said top insert opening.

11. The method of installing a sunroof insert into a removable roof panel of a vehicle of claim 9, further comprising the steps of:
applying a second peripheral strip of tape to a bottom surface of said bottom skin adjacent a perimeter of said bottom insert opening.

12. The method of installing a sunroof insert into a removable roof panel of a vehicle of claim 9, further comprising the steps of:
inserting a plurality of spacer tools between said upper insert opening and said peripheral sidewall, while said bottom adhesive is curing.

13. The method of installing a sunroof insert into a removable roof panel of a vehicle of claim 9, further comprising the steps of:
inserting a top gasket molding into said top peripheral gap.

14. The method of installing a sunroof insert into a removable roof panel of a vehicle of claim 11, further comprising the steps of:
trimming an excess of said second peripheral strip of tape from an outer perimeter of said peripheral flange.

\* \* \* \* \*